United States Patent
Takeda et al.

(10) Patent No.: US 8,392,569 B2
(45) Date of Patent: Mar. 5, 2013

(54) DATA DELIVERY SYSTEM AND DATA DELIVERY METHOD

(75) Inventors: Iori Takeda, Kagawa (JP); Noritaka Tani, Kagawa (JP); Koichi Misaki, Kagawa (JP); Hitoshi Kamura, Kagawa (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/616,442

(22) Filed: Nov. 11, 2009

(65) Prior Publication Data
US 2010/0223384 A1    Sep. 2, 2010

(30) Foreign Application Priority Data
Mar. 2, 2009 (JP) ................................. 2009-048092

(51) Int. Cl.
*G06F 15/173* (2006.01)
(52) U.S. Cl. ......... 709/226; 709/223; 709/227; 707/822
(58) Field of Classification Search .................. 709/223, 709/226; 713/323
See application file for complete search history.

(56) References Cited

U.S. PATENT DOCUMENTS

| | | | | |
|---|---|---|---|---|
| 5,485,625 A | * | 1/1996 | Gumkowski | 713/323 |
| 7,774,391 B1 | * | 8/2010 | Le et al. | 707/822 |
| 7,882,153 B1 | * | 2/2011 | Cook et al. | 707/811 |
| 2003/0135613 A1 | | 7/2003 | Yoshida et al. | |
| 2004/0215757 A1 | * | 10/2004 | Butler | 709/223 |
| 2006/0116884 A1 | * | 6/2006 | Itaki et al. | 704/271 |
| 2008/0069303 A1 | * | 3/2008 | Kim | 378/98.2 |
| 2008/0103786 A1 | * | 5/2008 | Zhang et al. | 705/1 |
| 2009/0113253 A1 | * | 4/2009 | Wang et al. | 714/48 |
| 2009/0144224 A1 | * | 6/2009 | Phan et al. | 707/1 |

FOREIGN PATENT DOCUMENTS

| | | |
|---|---|---|
| JP | 9-185529 | 7/1997 |
| JP | 2003-256303 | 9/2003 |
| JP | 2007-80167 | 3/2007 |

* cited by examiner

*Primary Examiner* — Tesfay Yohannes
(74) *Attorney, Agent, or Firm* — Staas & Halsey LLP

(57) ABSTRACT

A data delivery system and method include storing software resources in a central equipment, receiving and storing software resources sent from the central equipment, and communicating with the central equipment, terminal devices and with the intermediate server. The central equipment includes a registration-accepting unit for accepting registration of software resources, a resource information storage unit for storing resource information having a version number corresponding to the software resources accepted by the registration-accepting unit, a resource transfer unit for sending the software resources accepted and the resource information stored in the resource information storage unit to the intermediate server, a server list-creating unit for creating a server list of the intermediate servers to be sent to the terminal devices, and a sending unit for sending the server list created by the server list-creating unit.

8 Claims, 12 Drawing Sheets

FIG. 3A

| SID | SOFTWARE RESOURCE NAME | LAST UPDATE DATE |
|---|---|---|
| 1 | AAA | **//** |
| 2 | BBB | **//** |
| 3 | CCC | **//** |
| ⋮ | ⋮ | ⋮ |

FIG. 3B

| CONNECTED SERVER NAME | PROCESSING LOAD | STATUS OF SYNCHRONIZATION |
|---|---|---|
| SUB-SERVER A | 30% | OK |
| SUB-SERVER B | 20% | OK |
| SUB-SERVER C | 50% | OK |
| ⋮ | ⋮ | ⋮ |

FIG. 3C

| PCID | CONNECTED PC NAME | DATE OF LIST CREATION |
|---|---|---|
| 1 | PC-AAA | **//** |
| 2 | PC-BBB | **//** |
| 3 | PC-CCC | **//** |
| ⋮ | ⋮ | ⋮ |

FIG. 3D

| SID | PCID | STATUS OF INSTRUCTION | DATE OF COMPLETION OF RECEPTION |
|---|---|---|---|
| 1 | 1 | DURING INSTRUCTION | **//** |
| 1 | 2 | DURING RECEPTION | **//** |
| 1 | 3 | COMPLETION OF RECEPTION | **//** |
| ⋮ | ⋮ | ⋮ | ⋮ |

| ORDER | SERVER NAME |
|---|---|
| 1 | SUB-SERVER B |
| 2 | SUB-SERVER A |
| 3 | MAIN SERVER |
| ⋮ | ⋮ |

DATA DELIVERY SYSTEM AND DATA DELIVERY METHOD

CROSS-REFERENCE TO RELATED APPLICATIONS

This application is based upon and claims the benefit of priority of the prior Japanese Patent Application No. 2009-48092, filed on Mar. 2, 2009, the entire contents of which are incorporated herein by reference.

FIELD

The embodiments relate to data delivery system and data delivery method for storing the same data in a central terminal or central equipment and intermediate servers, all of which are connected by a network, and receiving data by terminal devices.

BACKGROUND

In recent years, systems for managing software resources by making use of a network have been introduced in schools, hospitals, companies, and so on. Such a system constitutes a three-layered structure including a host server layer, an intermediate server layer, and a client server layer (such as personal computers). A host server in the host server layer stores software resources necessary for client devices and is connected with intermediate servers in the intermediate server layer. The intermediate servers download the software resources from the host server and store software resources similar to the software resources stored in the host server. The client devices download the software resources from the intermediate servers.

In the system of this configuration, a user can download the software resources existing in the host server from an intermediate server by means of a client device (such as a personal computer) owned by the user. For example, where the system is introduced in an enterprise, employees of its branches can acquire the software resources present in the headquarter from intermediate servers mounted in the branches by mounting the host server in the headquarter and mounting the intermediate servers in the branches. An administrator who manages the system can distribute the newest software resources to the client devices simply by updating the software resources present in the host server to the newest version.

In this system, each client device cannot reliably grasp whether or not the software resources in the host server are of the newest version. Accordingly, a system permitting reliable dispersion of software resources has been contemplated (e.g., JP-A-2007-80167). In this system, an intermediate server monitors whether software resources stored in a host server have been updated. If an update is performed, the intermediate server updates the software resources stored in itself and informs each client device of the update. When the client device is informed of the update, the client device receives the software resources from the intermediate server. Consequently, the client device can receive the newest software resources with greater certainty.

SUMMARY

According to an aspect of the invention, a data delivery system and method include receiving and storing software resources sent from a central equipment, and terminal devices communicating with the central equipment and with the intermediate server, where the central equipment accepts registration of software resources, stores resource information having a version number corresponding to the software resources accepted by the registration-accepting, sends the software resources accepted by the registration-accepting and the resource information stored in the resource information storage unit to the intermediate server.

A server list-creating unit is provided for creating a server list of the intermediate servers to be sent to the terminal devices and a list/information-sending unit for sending the server list created by the server list-creating unit and the resource information to the terminal devices. Each of terminal devices has a synchronization decision unit for acquiring the resource information sent from the intermediate server shown in the server list received from the central equipment by the resource transfer unit and stored in the intermediate server, comparing the resource information received from the central equipment with the resource information acquired from the intermediate server, and deciding whether the intermediate server is synchronized to the central equipment based on whether the two sets of resource information are coincident in version number of software resources and a request signal-sending unit which, when the synchronization decision unit has determined that the intermediate server is synchronized, sends a request signal requesting sending of software resources to the intermediate server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3A is a table used to manage software resource(s);

FIG. 3B is a table used to manage sub-servers;

FIG. 3C is a table used to manage personal computers (PCs);

FIG. 3D is a table used to manage how the PCs have been instructed;

DETAILED DESCRIPTION OF EMBODIMENTS

Figure 1:
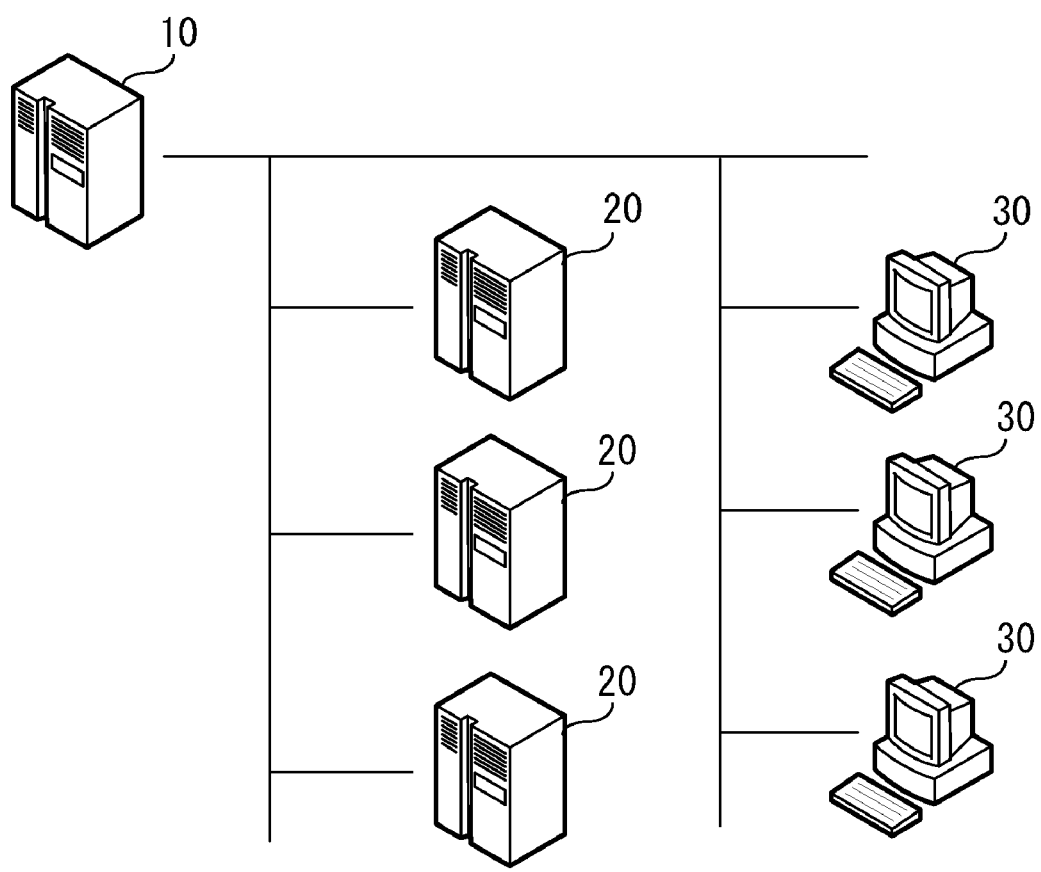
FIG. 1 is a diagram illustrating a configuration of a data delivery system associated with one embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Where an intermediate server monitors a version of software resources, it is necessary for the intermediate server to monitor a host server at all times. In addition, the intermediate server needs to monitor information about client devices (e.g., whether the client devices have been informed of an update). Therefore, if a number of the client devices increases, it is necessary to register the added client devices into the intermediate server, thus increasing the load on the intermediate server.

In the data delivery system disclosed herein, software resource(s) sent from a central terminal or central equipment storing the software resources are stored in an intermediate server. The software resources stored in the intermediate server are received by a terminal device. In the central equipment, registration of the software resources is accepted. Resource information for storing the software resources in association with the version of the software resources is stored. The accepted software resources and resource information are sent to the intermediate server. A server list of intermediate servers that give a notification to client devices is created. The server list is sent to the client devices from the central equipment together with the resource information. In each client device, resource information is acquired from the intermediate server shown in the server list received from the central equipment. The resource information is sent from the central equipment to the intermediate server and stored there. The resource information acquired from the central equipment is compared with the resource information acquired from the intermediate server. A decision is made as to whether the intermediate server is synchronized with the central equipment, depending on whether the software resources indicated by the two kinds of resource information are coincident in version number. If the decision is that the intermediate server is synchronized, a request signal is sent to the intermediate server to require it to send the software resources.

The data delivery system disclosed herein makes it possible to make a decision as to whether or not the software resources to be received by terminal devices are present in the intermediate server in a case where an inquiry about the software resources is received from a terminal device because the central equipment already knows, for example, that the software resources have been already sent to the intermediate server. The terminal device receives data from the intermediate server based on the result of decision made by the central equipment and so it is not necessary to make an inquiry to the intermediate server as to whether or not there are software resources. Furthermore, the data delivery system disclosed herein makes it unnecessary to make a decision as to whether the software resources stored in the central equipment agree with the software resources stored in the intermediate server. The terminal device receiving the results of inquiry from the central equipment makes a decision as to whether the two kinds of software resources are coincident. As a result, the processing load on each server or device is alleviated. Consequently, the terminal device can receive the software resources from the central equipment with greater certainty.

The terminal device is proactive in making an inquiry about transfer of software resources. Thus, it is not necessary for the central equipment and the intermediate server to manage terminal devices minutely. Furthermore, programming operation(s) in the central equipment and in the intermediate server are simplified. In consequence, the processing load on the central equipment and on the intermediate server is alleviated. The terminal device sends a list, which indicates from what intermediate server are software resources received, to the terminal device. This disperses the load on intermediate servers when the terminal device receives software resources. The processing speed achieved when software resources are received can be managed appropriately.

Preferred embodiments of data delivery system and data delivery method disclosed herein are hereinafter described in detail with reference to the drawings. The data delivery system and data delivery method disclosed herein are introduced in schools, hospitals, companies, and so on. In the embodiments described below, terminal devices possessed by the data delivery system disclosed herein are applied to personal computers (PCs).

FIG. 1 shows a configuration of a data delivery system associated with an embodiment. The data delivery system of the present embodiment has one main server 10, plural sub-servers 20, and plural personal computers (PCs) 30.

The main server 10 is central equipment possessed by the data delivery system disclosed herein and stores software resources entered by the system administrator or other person. The software resources are data disclosed herein and can be appropriately modified according to a location in which the data delivery system is introduced. For example, the software resources can be electronic medical charts of hospitals, students' report cards, version upgrade data about programs, or virus pattern files. When new software resources are entered by the system administrator or other user, the main server 10 sends the software resources to the sub-servers 20. When the software resources already stored are modified or updated, the main server 10 sends the modified software resources to the sub-servers 20. While specific examples of a resource such as software resource is provided herein, the present invention is not limited to any particular type of resource. For example, may include software or application program, a tool or any other information that may reside in a server and delivered to terminal(s).

The sub-servers 20 are intermediate servers possessed by the data delivery system disclosed herein, and receive and store the software resources sent from the main server 10. In other words, the sub-servers 20 store software resources of the same contents as the software resources in the main server 10. When the contents of storage in the main server 10 are modified, the software resources are sent. Accordingly, a modification of the contents of storage in the main server 10 is reflected in the sub-servers 20. The sub-servers 20 may be installed in the same location or building as the main server 10 or remotely from the main server.

The PCs 30 are connected with the main server 10 and with the sub-servers 20 such that data communications among them are possible. The PCs 30 receive stored software resources from any one of the main server 10 and sub-servers 20. As described previously, software resources having the same contents are stored in the main server 10 and sub-servers 20. Consequently, the PCs 30 can receive the same software resources from any server.

In the data delivery system having the aforementioned servers and devices, when the power supply of any one PC 30 is activated, it sends an inquiry signal to the main server 10. If the main server 10 receiving the inquiry signal has a newest software resources stored therein, the server 10 permits the PC 30 to receive the newest software resources. Accordingly, the PC 30 is enabled to acquire the newest software resources at start-up. While the trigger to acquire newest (updated) version of information or resource is described as being at a start-up, the present invention is not limited thereto.

The main server 10 receiving the inquiry signal determines plural servers to be accessed by the PC 30 to receive the software resources, and prioritizes the determined servers. The PC 30 gains access to the servers in the determined order until reception of the newest software resources succeeds. Because plural servers are determined as devices to be accessed, if the PC 30 fails to receive software resources from one access destination, the PC can reattempt to receive from other access destination. The configurations and operation of the main server 10, each sub-server 20, and each PC 30 are hereinafter described in detail.

The main server 10, sub-servers 20, and PCs 30 may be connected with wires or wirelessly. The communication environment in which the main server 10, sub-servers 20, and PCs 30 are used is a LAN (local area network), a WAN (wide area network), or any other network. Furthermore, cell phones, PDAs (personal digital assistants), or the like may be used instead of the PCs 30.

Figure 2:
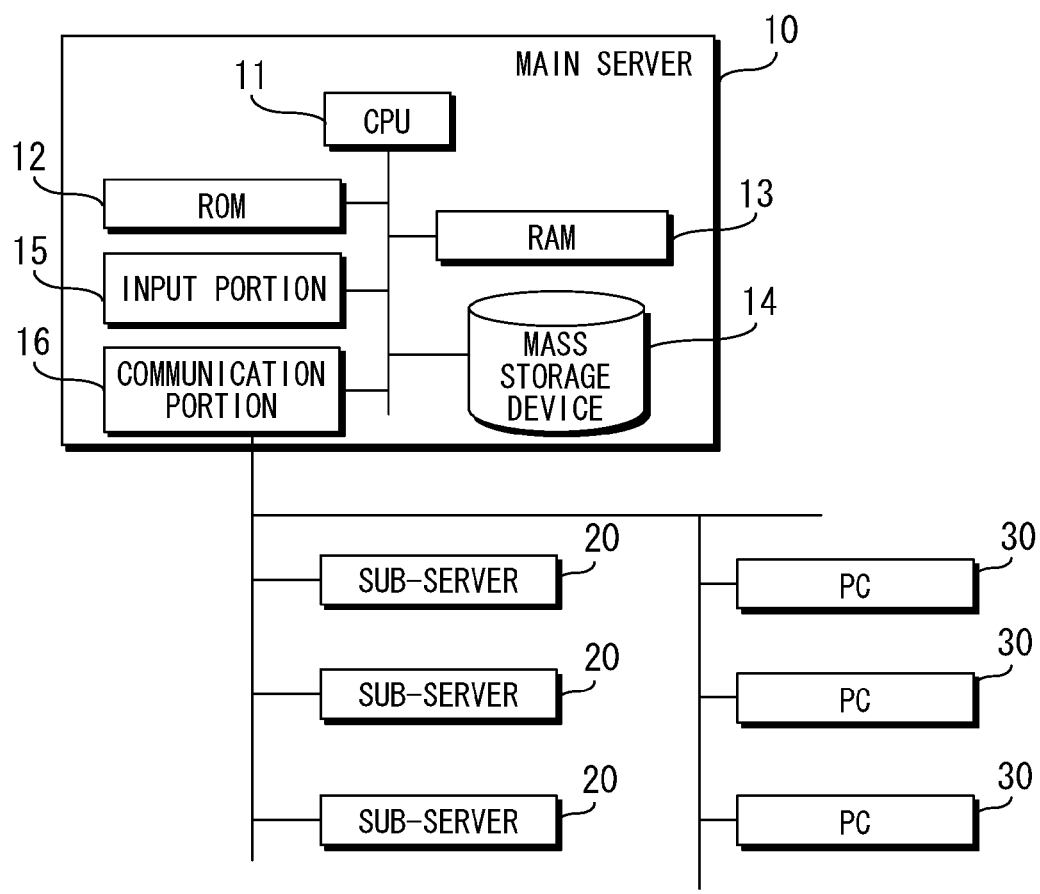
FIG. 2 is a block diagram illustrating a configuration of a main server incorporated in a data delivery system.

FIG. 2 is a block diagram illustrating a configuration of the main server 10 possessed by a data delivery system.

The main server 10 has a CPU (central processing unit) 11, a ROM (read-only memory) 12, a RAM (random access memory) 13, a mass storage device 14, an input portion 15, a communication portion 16, and other hardware portions. These hardware portions are interconnected via a bus. The input portion 15 includes a mouse, a keyboard, and a scanner for entering or modifying software resources. The communication portion 16 is made of a modem or the like permitting data communications with the sub-servers 20 and PCs 30.

The CPU 11 reads a control program previously stored in the ROM 12 into the RAM 13 appropriately and executes the program. The CPU 11 controls the operation of the hardware portions. Various control programs necessary to operate the main server 10 as the central equipment disclosed herein are previously stored in the ROM 12. The RAM 13 is a static RAM (SRAM), a DRAM (dynamic RAM), a flash memory, or other memory. Various kinds of data produced during execution of a control program performed by the CPU 11 are temporarily stored in the RAM 13.

The mass storage device 14 is a hard disk (HDD), for example. Software resources entered by the input portion 15 and tables used for managing the software resources, the sub-servers 20, and PCs 30 are stored in the mass storage device 14. FIG. 3A is a table used to manage the software resources. FIG. 3B is a table used to manage the sub-servers 20. FIG. 3C is a table used to manage the PCs 30. FIG. 3D is a table used to manage how the PCs are instructed.

Identification information (such as a file name) for software resources stored in the mass storage device 14 is stored in the table of FIG. 3A, together with an ID (SID (server identification) in the figure). Furthermore, a date at which software resources corresponding to the identification information were updated finally is stored. "Update of software resources" includes a case where new software resources are entered. Where the software resources are updated, the CPU 11 rewrites the table and sends the updated software resources and the table shown in FIG. 3A to the sub-servers 20.

Identification information (such as a server name or IP address) about each sub-server 20 connected with the main server 10 is stored in the table of FIG. 3B. In addition, processing load on the sub-server 20 corresponding to the identification information is stored in the table. Information indicating whether this sub-server 20 is synchronized with the main server 10 is also stored. The processing load is a CPU load rate of the sub-server 20, for example. If the sub-server 20 is synchronized with the main server 10, the status of synchronization is "OK". If not so, the status is "NG". The CPU 11 periodically monitors the processing load on the sub-server 20 and updates the table of FIG. 3B. The CPU 11 grasps what sub-servers 20 are heavily loaded.

Identification information (e.g., a computer name) about each PC 30 is stored in the table of FIG. 3C, together with an ID (PCID in the figure). The date at which a server list was created for the PC 30 corresponding to the identification information is stored in the table. Data defining an order in which the main server 10 and sub-servers 20 are to be accessed when the PC 30 receives software resources is stored in the server list. The server list is created when an inquiry signal is received from the PC 30. Accordingly, the CPU 11 can grasp the date at which the latest inquiry signal was received from the date of creation of the server list.

Combinations of SIDs of the sub-servers 20 and PCIDs of the PCs 30 are stored in the table of FIG. 3D. These combinations indicate the connections among the sub-servers 20 and PCs 30. All possible combinations are created. For each combination, a status (i.e., how each server is instructed) and the date of completion of reception are made to correspond and stored. Each status indicates what instruction is given from each PC 30 to the sub-server 20. "During reception" of status indicates the state in which a PC 30 is receiving software resources from a sub-server 20. "Reception completion" of status indicates that the PC 30 has completed the reception of software resources from the sub-server 20. The case of a combination of SID "1" and PCID "1" of FIG. 3D is now described as an example. The sub-server 20 having SID "1" and the PC 30 having PCID "1" connected with the sub-server are receiving instructions from the main server 10. The PC 30 having PCID "1" received software resources from the sub-server 20 having SID "1" at a date "**\*\*/\*\*/\*\***".

Figures 4A, 4B:
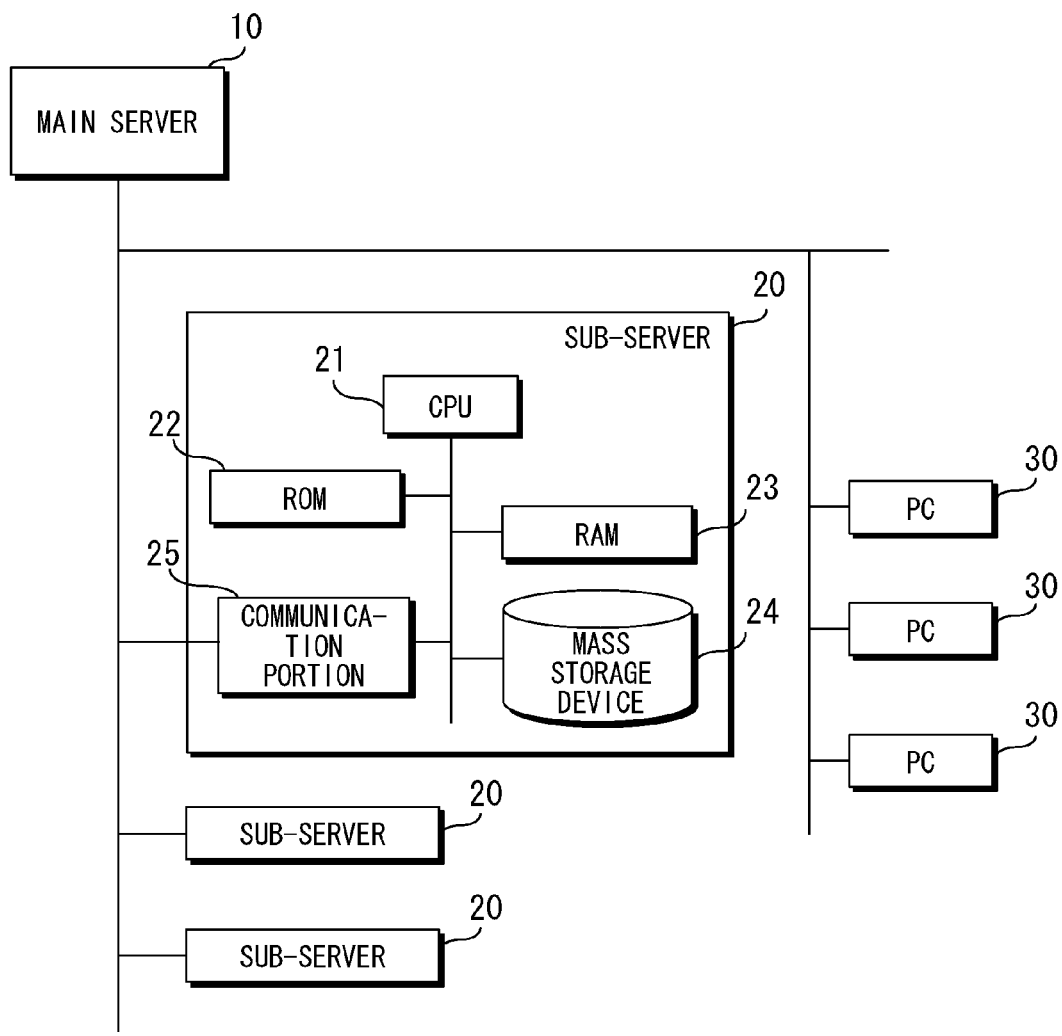
FIG. 4A is a table illustrating a server list created by a main server.
FIG. 4B is a block diagram of one sub-server incorporated in a data delivery system, illustrating the configuration of the sub-server.

FIG. 4A shows a server list created by the main server 10. Identification information (such as server names) about the main server 10 and sub-servers 20 which have been prioritized are stored in the server list. In the server list, the most lightly loaded server in FIG. 3B is given the top priority. In the case of FIG. 3B, the sub-server B having processing load of 20% (i.e., most lightly loaded) is given the top priority. The main server 10 set to have some priority (e.g., third-order priority in FIG. 4A) is contained in the server list. The priority of the main server 10 may be previously set. Alternatively, the order of priorities may be set based on the processing loads on the sub-servers 20.

The server list of FIG. 4A is created when the main server 10 receives an inquiry signal from one PC 30. The created list is sent to the PC 30. The PC 30 receiving the server list accesses the servers in the set order. In the case of FIG. 4A, the PC 30 first accesses sub-server B and receives software resources. At this time, if no software resources are stored in the sub-server B and no software resources are received from the sub-server B, then the PC 30 accesses sub-server A. The PC 30 accesses the servers in turn according to the server list until software resources are successfully received. The software resources to be received by the PC 30 are reliably stored in the main server 10. Therefore, by including the main server 10 in the server list, if the PC 30 continues to fail to receive software resources from the sub-servers 20, the PC can receive the software resources from the main server 10.

FIG. 4B is a block diagram of the sub-servers 20 equipped in the data delivery system, illustrating the configuration of the sub-servers 20.

Each sub-server 20 has a CPU 21, a ROM 22, a RAM 23, a mass storage device 24, a communication portion 25, and other hardware portions. These hardware portions are interconnected via a bus. The communication portion 25 permits data communications between the main server 10 and PCs 30.

The CPU 21 reads a control program previously stored in the ROM 22 into the RAM 23 appropriately and executes the program. The CPU 21 controls the operation of the hardware portions. Various control programs necessary to operate the sub-server 20 as an intermediate server disclosed herein are previously stored in the ROM 22. The RAM 23 is an SRAM, a DRAM, a flash memory, or other memory. Various kinds of data produced during execution of a control program performed by the CPU 21 are temporarily stored in the RAM 23. The mass storage device 24 is a HDD, for example. Software resources sent from the main server 10 are stored in the mass storage device 24.

Figure 5:
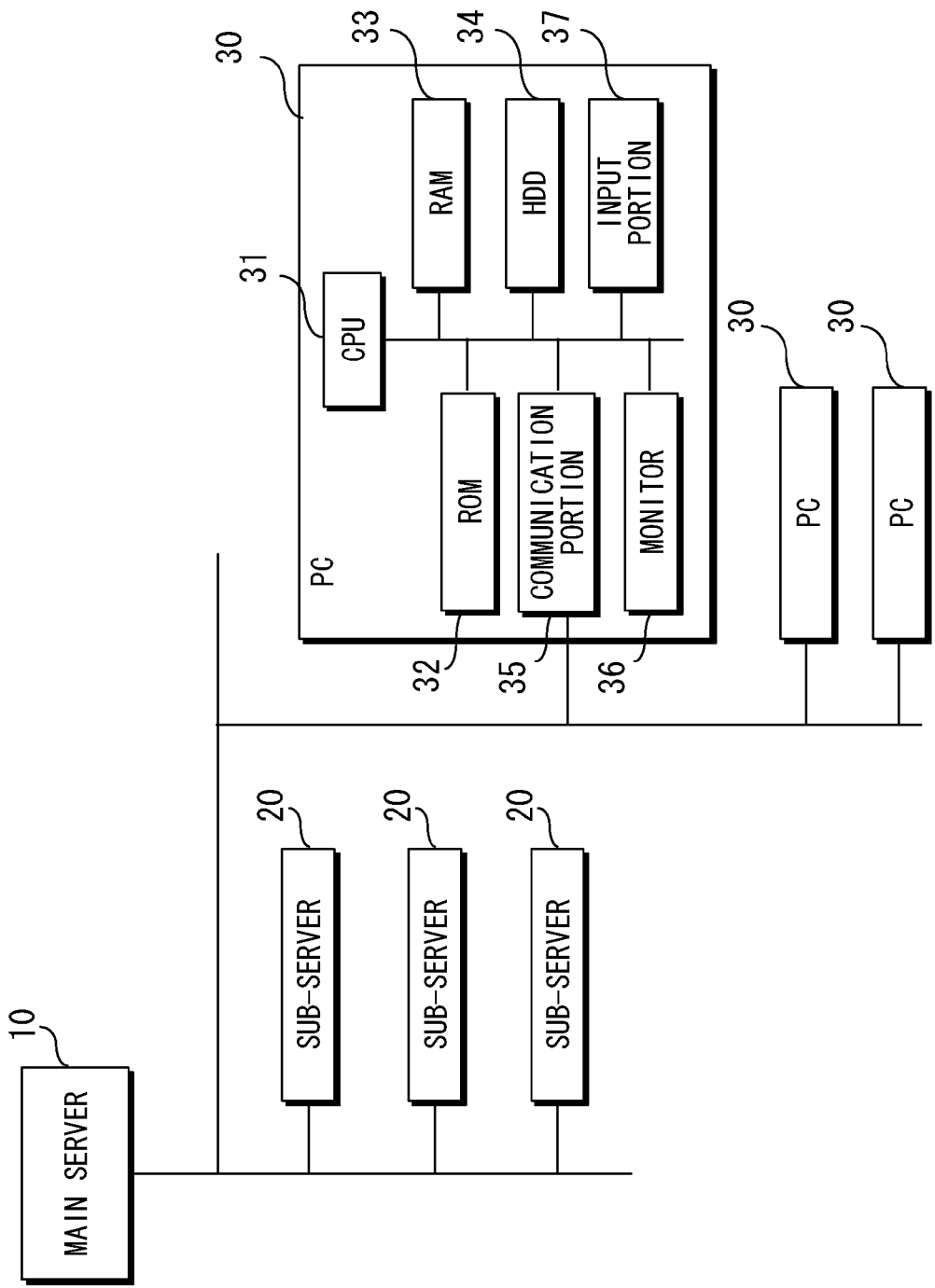
FIG. 5 is a block diagram of one PC incorporated in a data delivery system, illustrating the configuration of the PC.

FIG. 5 is a block diagram of the PCs 30 equipped in the data delivery system, illustrating the configuration of each PC 30.

Each PC 30 has a CPU 31, a ROM 32, a RAM 33, a HDD 34, a communication portion 35, a monitor 36, an input portion 37, and other hardware portions. These hardware portions are interconnected via a bus. The communication portion 35 permits data communications with the main server 10 and sub-servers 20. The monitor 36 is made of a liquid crystal display or CRT (cathode-ray tube). The input portion 37 includes a mouse and a keyboard.

The CPU 31 reads a control program previously stored in the ROM 32 into the RAM 33 appropriately and executes the program. The CPU 31 controls the operation of the hardware portions. Various control programs necessary to operate the PC 30 as one terminal device disclosed herein are previously stored in the ROM 32. The RAM 33 is an SRAM, a DRAM, a flash memory, or other memory. Various kinds of data produced during execution of a control program performed by the CPU 31 are temporarily stored in the RAM 33. The HDD 34 stores the software resources and other data received from the main server 10 or sub-servers 20.

Figure 6:
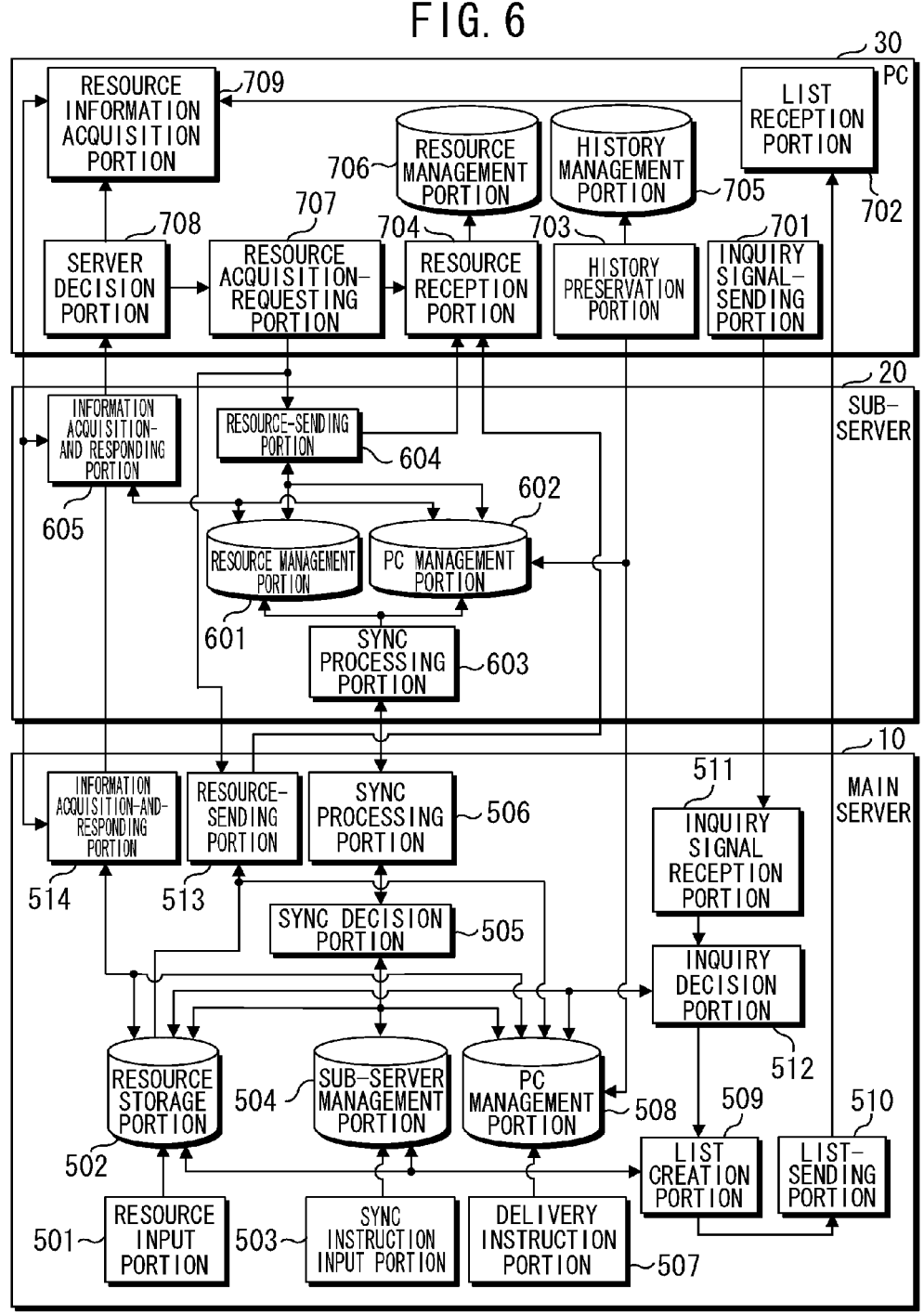
FIG. 6 is a block diagram illustrating function(s) provided by a data delivery system.

Functions implemented when the main server 10, sub-servers 20, and PCs 30 execute various control programs are next described. FIG. 6 is a block diagram illustrating function(s) possessed by a data delivery system.

The main server 10 of the present embodiment has function(s) of a resource input portion 501, a resource storage portion 502, a sync instruction input portion 503, a sub-server management portion 504, a sync decision portion (sync decision unit) 505, a sync processing portion (load detection unit) 506, a delivery instruction portion 507, a PC management portion 508, a list creation portion (order determination unit) 509, a list-sending portion 510, an inquiry signal reception portion 511, an inquiry decision portion 512, a resource-sending portion (sending unit of the central equipment) 513, and an information acquisition-and-responding portion 514.

The sub-server 20 of the present embodiment has function(s) of a resource management portion 601, a PC management portion 602, a sync processing portion 603, a resource-sending portion (sending unit of the intermediate server) 604, and an information acquisition-and-responding portion 605. Each PC 30 of the present embodiment has functions of an inquiry signal sending portion 701, a list reception portion 702, a history reservation portion 703, a resource reception portion 704, a history management portion 705, a resource management portion 706, a resource acquisition-requesting portion (request signal-sending unit) 707, a server decision portion (reception decision portion) 708, and a resource information acquisition portion 709.

The resource storage portion 502 of the main server 10 stores the software resources entered from the resource input portion 501 and the table of FIG. 3A. The resource-sending portion 513 sends the software resources stored in the resource storage portion 502 to the PCs 30. The sub-server management portion 504 stores the table of FIG. 3B and manages the sub-servers 20. The PC management portion 508 stores the tables of FIGS. 3C and 3D and manages the PCs 30.

The sync instruction input portion 503 enters an instruction for starting synchronization with the sub-servers 20. The sync decision portion 505 makes a decision from the table of FIG. 3B as to whether unsynchronized sub-servers 20 are synchronized. The sync processing portion 506 synchronizes the unsynchronized sub-servers 20 with the main server 10. At this time, the items of the table of FIG. 3B indicating whether the sub-servers are synchronized are updated. The sync processing portion 506 sends the software resources and information about the PCs 30 managed by the PC management portion 508 to the synchronized sub-servers 20. The information about the PCs 30 is given, for example, by the table of FIG. 3C. Furthermore, the sync processing portion 506 acquires the processing loads on the sub-servers 20. At this time, the processing loads listed in the table of FIG. 3B are updated.

The sync processing portion 603 of each sub-server 20 performs processing for achieving synchronization with the sync processing portion 506 of the main server 10. The sync processing portion 603 receives the software resources sent from the synchronized main server 10 and information about the PCs 30. The resource management portion 601 stores the software resources received by the sync processing portion 603. The PC management portion 602 stores information about the PCs 30, the information being received by the sync processing portion 603.

The delivery instruction portion 507 instructs the main server 10 to modify the instructed statuses shown in FIG. 3D. After the modification of the instructed statuses, the delivery instruction portion 507 calls the sync processing portion and performs processing for synchronization. As a result, a decision criterion is created which is used when the inquiry decision portion 512 makes a decision as to whether there are software resources to be received when each PC 30 makes an inquiry to the main server.

When the power supply of one PC 30 is turned on and activation of each hardware portion is completed, the inquiry signal-sending portion 701 sends an inquiry signal to the main server 10. The sent inquiry signal is received by the inquiry signal reception portion 511 of the main server 10. The inquiry decision portion 512 makes a decision as to whether there are software resources to be received by the PC 30.

In particular, the inquiry decision portion 512 identifies the PC 30 that sent the inquiry signal, and acquires the date of creation of the server list created for the identified PC 30 from the list of FIG. 3C. If the date of reception is later than the date at which the list was created, the decision portion makes a decision based on the date of last update of FIG. 3A as to whether there are updated software resources between the date of reception and the date of creation of the list. If there are updated software resources, the inquiry decision portion 512 determines that there are software resources to be received by the PC 30.

If the inquiry decision portion 512 has determined that there are software resources to be received, the list creation portion 509 creates a list of servers from the table shown in FIG. 3B. These servers include sub-servers 20 which have status of synchronization "OK", as well as the main server 10. The servers of the list are prioritized from the sub-server 20 having a minimum processing load. Each PC 30 accesses servers in the order defined by the server list. The PC 30 accesses the server having a minimum processing load first. Consequently, the PC 30 can be made to make minimum accesses to a heavily loaded device. As a result, loads on the network or servers can be dispersed. The list creation portion 509 may create a server list based on predetermined priority orders of the sub-servers 20. The creation portion may create a server list while taking account of the load on the network. In addition, the list creation portion may create a server list while taking account of the status of each sub-server 20 in which it is waiting for completion of processing operations. Any method can be appropriately modified as long as it can disperse the load on the network or on servers.

In this way, the main server 10 extracts synchronized sub-servers 20 and creates a server list. This makes it unnecessary for each PC 30 to make an inquiry to unsynchomized sub-servers 20. By including the main server 10 in the server list, it is assured that software resources are received from the main server 10 even if the PC 30 cannot receive software resources from the sub-servers 20.

The list-sending portion 510 sends the server list created by the list creation portion 509 to the PC 30 that sent an inquiry signal. The list reception portion 702 of the PC 30 receives the server list. The resource information acquisition portion 709 accesses the main server 10 or sub-server 20 to which the top priority is given in the received server list, and makes an inquiry as to whether software resources are stored.

In response to the inquiry from the resource information acquisition portion 709, each of the information acquisition-and-responding portion 514 of the main server 10 and the information acquisition-and-responding portion 605 of the sub-server 20 sends a reply indicating whether there are software resources to the PC 30. The server decision portion 708 of the PC 30 acquires the results from the information acquisition-and-responding portion 514 and the information acquisition-and-responding portion 605 and makes a decision as to whether or not software resources are stored. Where they are stored, the resource acquisition-requesting portion 707 requests the main server 10 or sub-server 20 to send software resources. Where no software resources are stored, the resource information acquisition portion 709 accesses other main server 10 or sub-server 20 according to the order set forth in the server list.

The resource-sending portion 513 of the main server 10 and the resource-sending portion 604 of the sub-server 20 send to the PC 30 software resources corresponding to the request from the PC 30. The resource reception portion 704 of the PC 30 receives the sent software resources and stores them in the resource management portion 706. The history preservation portion 703 stores the history of reception of software resources in the history management portion 705.

The history preservation portion 703 sends the history of reception to the main server 10 or the sub-server 20. The PC management portion 508 or 602 receiving the history of reception makes a decision as to whether the software resources received by the PC 30 are consistent with the software resources stored in the management portion itself. This makes it possible to make a decision as to whether the newest software resources have been acquired in the PC 30.

If the main server 10 is disabled, the PC 30 sends the history of reception to the sub-server 20. The sub-server 20 compares the history of reception of the PC 30 with the software resources stored in the sub-server itself. If the sub-server 20 does not receive the software resources stored in the PC 30 itself, the sub-server sends the software resources to the PC 30. Consequently, if the main server 10 is unable to operate, the PC 30 can receive software resources directly from the sub-server 20.

The operation of the main server 10, sub-servers 20, and PCs 30 of the data delivery system of an embodiment is hereinafter described.

Figure 7:
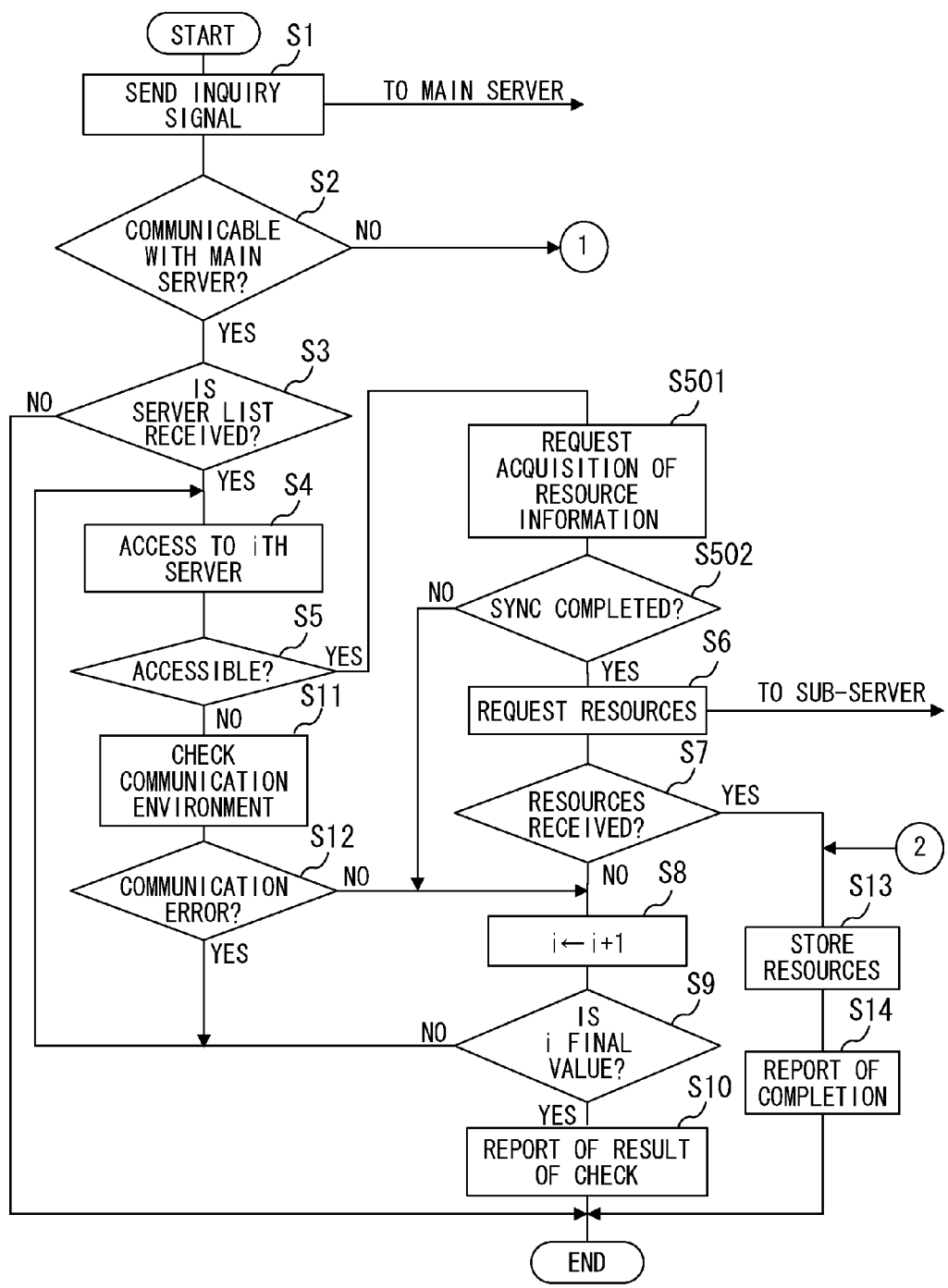
FIG. 7 is a flowchart illustrating processing operations performed by a PC.
Figure 8:
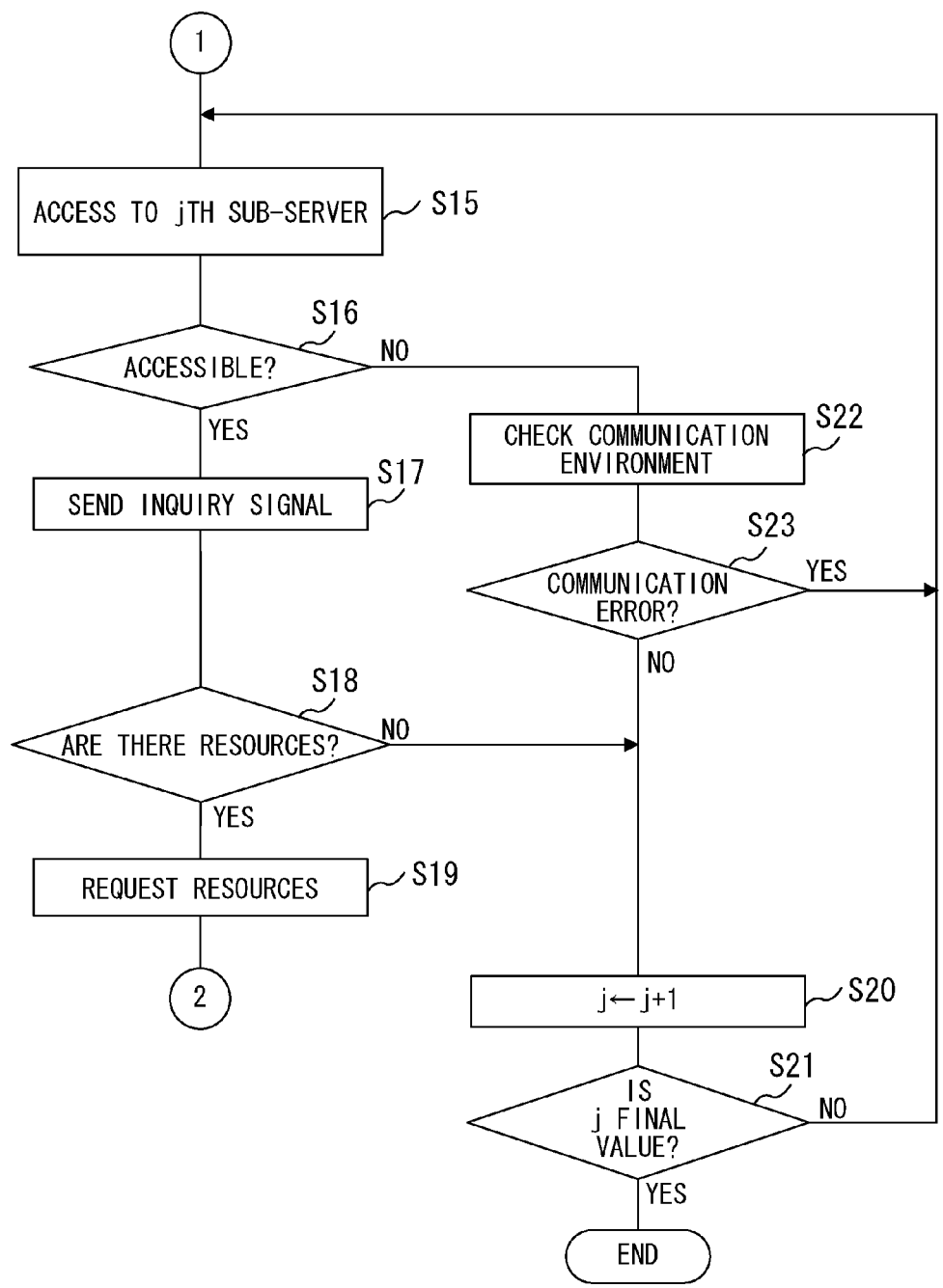
FIG. 8 is a flowchart illustrating other processing operations performed by a PC.

FIGS. 7 and 8 are flowcharts illustrating processing operations executed by each PC 30. The following processing operations are carried out by the CPU 31 according to a control program stored in the ROM 32 of the PC 30.

When the PC 30 is activated, the CPU 31 sends an inquiry signal to the main server 10 (S1). The CPU 31 makes a decision as to whether communications with the main server 10 are possible (S2). If communications with the main server 10 are possible, and if the main server 10 has received the inquiry signal, the main server 10 checks whether there are software resources to be received by the PC 30. If there are software resources, the main server creates a server list and sends it to the PC 30.

If communications with the main server 10 are possible (YES at S2), the CPU 31 makes a decision as to whether or not a server list is received (S3). If no server list is received (NO at S3), the CPU 31 determines that there are no software resources to be received, and terminates the processing routine. The CPU 31 may determine that there are no software resources to be received in a case where the CPU has received no server list during a certain period of time. Where the main server 10 creates no server list, the main server sends a signal (such as "null") to the PC 30. The CPU 31 may determine that there are no software resources to be received in a case where the CPU 31 receives the signal "null".

Where a server list is received (YES at S3), the CPU 31 accesses the main server 10 or sub-server 20 placed in the ith position (default value of i is 1) in the server list (S4). The CPU 31 makes a decision as to whether it has successfully accessed the main server 10 or sub-server 20 (S5). Where the access is successful (YES at S5), the CPU 31 asks (requests) the accessed server to acquire resource information (S501). Using the resource information held in the tables shown in FIGS. 3A and 3D, the CPU checks that the information held in the connected sub-servers 20 is consistent with the information held in the main server 10 and shown in FIGS. 3A and 3D. The CPU 31 makes a decision as to whether each connected sub-server 20 is synchronized with the main server 10 (S502).

Specifically, when the PC 30 receives a server list from the main server 10, the PC acquires the contents of the table shown in FIG. 3A from the main server 10. The PC 30 refers to the table shown in FIG. 3A and received from the main server 10 and to the table shown in FIG. 3A and received from the sub-server 20. If the two sets of data are coincident in date of update corresponding to the software resources to be downloaded, the PC determines that synchronization is achieved.

Where it is possible to determine that synchronization of the sub-server 20 is completed (YES at S502), the CPU 31 requests downloading of software resources (S6). If it is determined that the connected sub-server 20 is not synchronized (NO at S502), the CPU 31 goes to operation S8 (described below in detail), and performs an operation for connecting the next server based on the server list. The CPU requests the server at S501 to acquire resource information. These processing operations are repeated to find synchronized servers.

Then, the CPU 31 makes a decision as to whether it has successfully received software resources from the accessed server (S7). If no software resources are received (NO at S7), in other words, if the requested software resources are not stored in the accessed sub-server 20, the CPU 31 increments i by 1 (S8). Then the CPU 31 makes a decision as to whether or not the value of the incremented i is a final value (S9). The final value is the number of servers (which are sub-servers 20 and may include the main server 10) prioritized in the server list. If the value of i is not the final value (NO at S9), the CPU 31 returns control to S4, where similar processing is performed on the prioritized subsequent servers. If the value of i is the final value (YES at operation S9) (i.e., the CPU 31 has attempted to request all the servers in the server list to send resources), the CPU 31 checks the communication environment and makes a report of the result (S10).

Because the server list contains the main server 10 as mentioned previously, the access destinations of the PCs 30 contain the main server 10. Accordingly, even if each PC 30 cannot receive the requested software resources from the sub-servers 20, it is assured that the PC receives resources from the main server 10. Accordingly, if receptions of software resources from all the servers within the server list are all unsuccessful, the CPU 31 makes a decision as to whether there is any problem such as a network connection issue with the CPU itself. The result of the check may be reported to the main server 10 or sub-servers 20 and may be displayed on the monitor of each PC 30. Electronic mails may be sent to a device not contained in the data delivery system (such as a cell phone owned by the system administrator). This makes it easy to grasp whether the contents of storage in the main server 10 and sub-server 20 lack consistency or whether the communication environment or PC 30 has problems. As a result, the system administrator can perform subsequent works more easily. Hence, software resources can be distributed quickly and reliably.

On the other hand, if it is impossible to access the main server 10 or sub-server 20 (NO at S5), the CPU 31 checks the communication environment (S11). The CPU 31 makes a decision as to whether there is a communication error (S12). One of communication errors is that wireless communication is broken in a case where the PC 30 is performing the wireless communication. Thus, it is possible to grasp whether the cause of inaccessibility to the server is on the network or on the access destination server. If there is no communication error (NO at S12), the CPU 31 carries out processing operations subsequent to S8. If there is a communication error (YES at S12), the CPU 31 transfers control to S4, where an access is again attempted. In this case, the processing routine may be terminated when a given number of accesses are made. The routine may be terminated after the access is repeated for a given period. The operation S5 includes a case where the connection is broken while the PC 30 is communicating with any server.

If software resources are received from the accessed server (YES in S7), the CPU 31 stores the received software resources in the HDD 34 (S13). The CPU 31 sends a message indicating that reception of software resources has been normally completed to the main server 10 (S14).

If communication with the main server 10 is not possible (NO at S2), the CPU 31 accesses the jth sub-server 20 (S15). The case in which communication with the main server 10 is not possible occurs, for example, when the main server 10 has resulted in a system down. In this case, the PC 30 accesses the jth sub-server 20, where j has a default value of 1. This is a number arbitrarily attached to any sub-server 20 in the data delivery system.

The CPU 31 makes a decision as to whether access to the jth sub-server 20 is successful (S16). If the access failed (NO at S16), the CPU 31 checks the communication environment (S22). The CPU 31 makes a decision as to whether there is a communication error (S23). Consequently, it is possible to grasp whether the cause of inaccessibility to the server is on the network or on the access destination server. If there is no communication error (NO at S23), the CPU 31 executes the processing operations subsequent to S20. If there is a communication error (YES at S23), the CPU 31 transfers control to S15, where an access is attempted again. In this case, the processing routine may be terminated when a give number of accesses are made. Alternatively, the processing routine may be terminated after the access is repeated for a given period of time. The operation S16 includes a case where the connection is broken while the PC 30 is communicating with any server.

Where the access is successful (YES at S16), the CPU 31 sends an inquiry signal to the accessed sub-server 20 (S17). Then, the CPU 31 makes a decision as to whether software resources are stored in the sub-server 20 (S18). At this time, the CPU 31 makes a decision based on the result sent from the sub-server 20 as to whether there are resources.

Where there are software resources (YES at S18), the CPU 31 requests the accessed sub-server 20 to send software resources (S19). The CPU 31 stores the received software resources in the HDD 34 (S13). Then, the CPU 31 sends a message indicating that reception of software resources has been normally completed to the main server 10 (S14).

Where there are no software resources (NO at S18), the CPU 31 increments j by 1 (S20). Then, the CPU 31 makes a decision as to whether or not the value of the incremented j is the final value (S21). The final value is the number of sub-servers 20 in the data delivery system. If the value of j is not the final value (NO at S21), the CPU 31 returns control to S15, where the CPU performs similar processing on the next sub-server 20. If the value of j is the final value (YES at S21) (i.e., the CPU 31 has attempted to request all the sub-servers 20 to send resources), the CPU 31 terminates the present processing routine. In this way, if the main server 10 is disabled, the PC 30 can receive software resources from the sub-servers 20.

Figure 9:
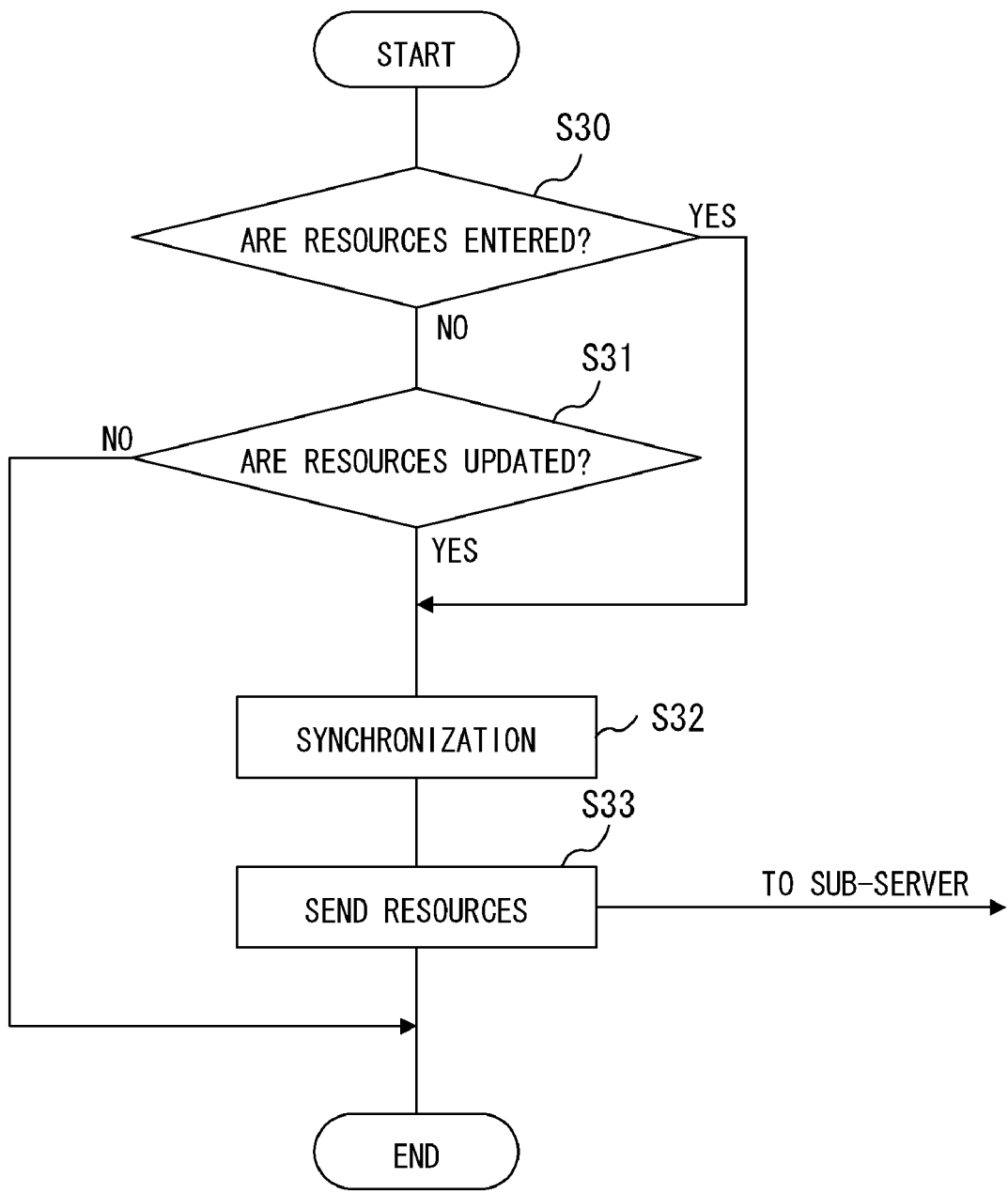
FIG. 9 is a flowchart illustrating processing operations executed by a main server to send updated software resource(s)
Figure 10:
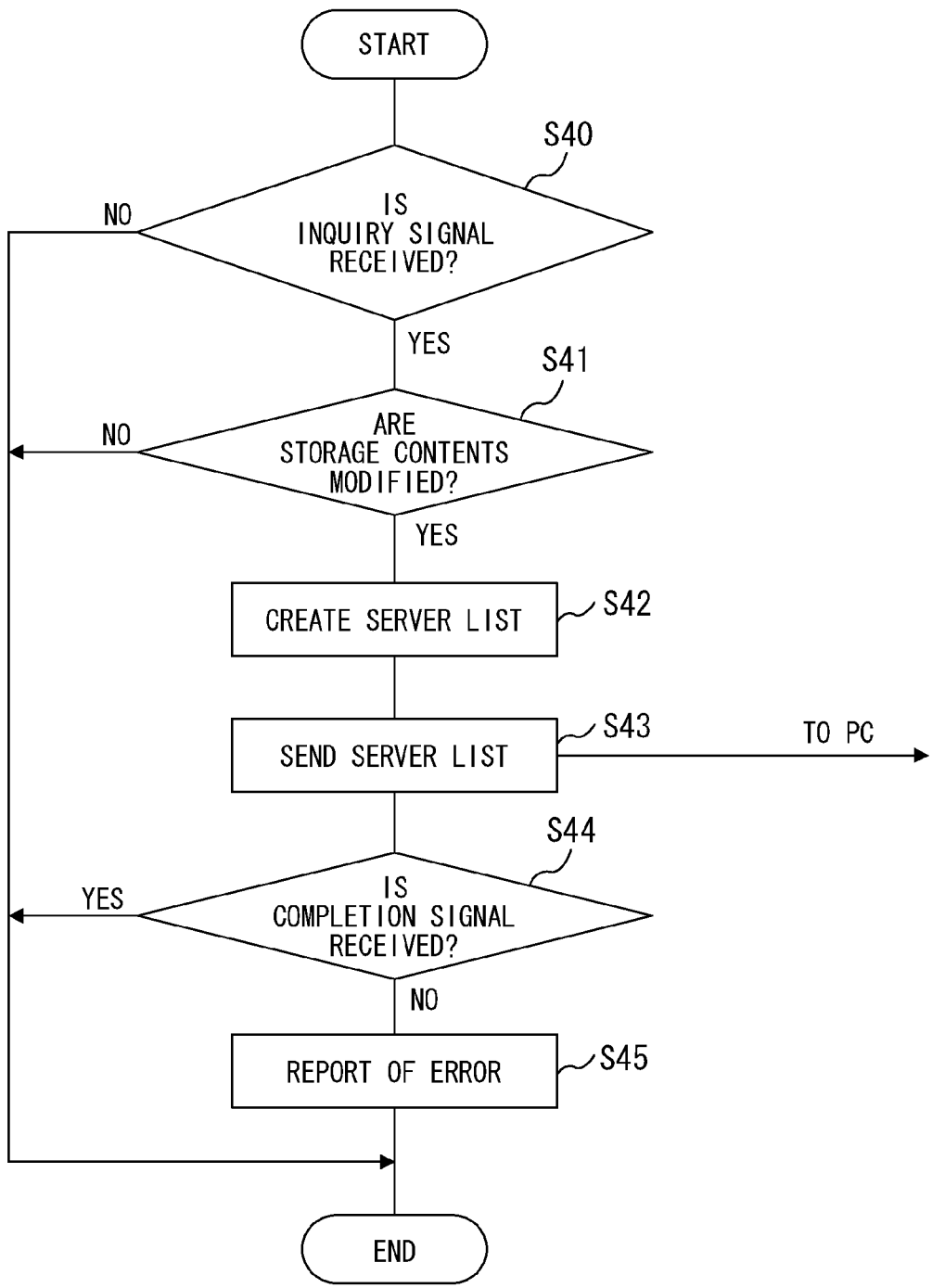
FIG. 10 is a flowchart illustrating processing operations executed by a main server to deliver software resource(s)
Figure 11A:
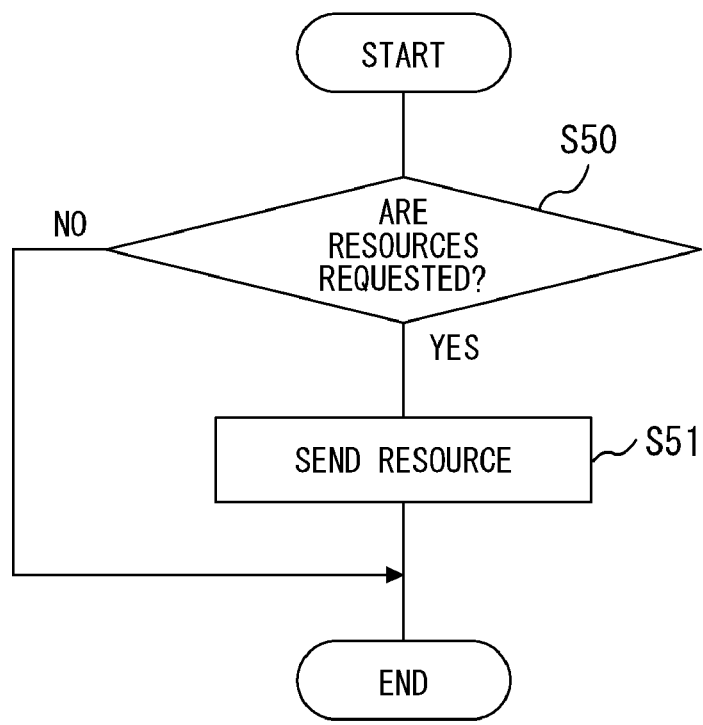
FIG. 11A is a flowchart illustrating processing operations executed by a main server to send requested software resource(s)

FIG. 9 is a flowchart illustrating processing operations for sending software resources that are updated by the main server 10. FIG. 10 is a flowchart illustrating processing performed by the main server 10 to deliver software resources. FIG. 11A is a flowchart illustrating processing operations performed by the main server 10 to send requested software resources. The following processing operations are carried out by the CPU 11 according to a control program stored in the ROM 12 of the main server 10.

In the processing routine of FIG. 9, the CPU 11 makes a decision as to whether or not new software resources are entered (S30). If new resources are not entered (NO at S30), the CPU 11 makes a decision as to whether the software resources already stored in the main server 10 are updated or modified (S31). The CPU 11 terminates the present processing routine unless new software resources are entered (NO at S31). If new software resources are entered (YES at S31) or if the stored software resources are updated or modified (YES at S30), the CPU 11 performs an operation for achieving synchronization with the sub-server 20 (S32). The CPU 11 sends the software resources to the synchronized sub-server 20 (S33). Consequently, the contents of the storage in the main server 10 can be reflected in the sub-server 20. The CPU 11 may repeat the operation for synchronization a given number of times on each sub-server 20 that could not be synchronized at S32. Alternatively, the CPU 11 may send an error message.

In operation S32, the CPU 11 sends a resource delivery starting signal indicating starting of sending of newly entered or updated software resources to each sub-server 20 that can communicate with the main server 10, using the communication portion 16. When the resource delivery starting signal is sent, the CPU 11 registers the status of synchronization "during instruction" of the destination sub-server 20 into the status of synchronization in the sub-server table shown in FIG. 3B or updates the status of synchronization.

In S32, the CPU 11 receives a resource delivery starting response, which is sent as a reply to the sent resource delivery starting signal from the sub-server 20, using the communication portion 16.

In S32, the CPU 11 starts to send software resources using the communication portion 16 to the sub-server 20 that sent the resource delivery starting response. At this time, the CPU 11 registers the status of synchronization "during reception" of the destination sub-server 20 into the status of synchronization in the sub-server table shown in FIG. 3B or updates the status of synchronization.

In S32, the CPU 11 registers the status of synchronization "sync completion (OK)" of the destination sub-server 20 associated with the operation for sending of software resources into the status of synchronization in the sub-server table shown in FIG. 3B or updates the status of synchronization when the operation for sending the software resources is completed. The CPU 11 can detect completion of the operation for sending according to whether the total amount of data sent to the sub-server 20 has reached the amount of data about software resources associated with the operation of sending. The CPU 11 can detect completion of the operation for sending by receiving a signal indicating that reception of software resources from the sub-server 20 is completed, using the communication portion 16.

In the processing routine of FIG. 10, the CPU 11 makes a decision as to whether it has received an inquiry signal from the PC 30 (S40). Where no inquiry signal is received (NO at S40), the CPU 11 terminates the present processing routine. Where an inquiry signal is received (YES at S40), the CPU 11 makes a decision as to whether the contents of storage have been modified (S41). In particular, the CPU 11 makes a decision as to whether new software resources have been entered or the current software sources have been modified after reception of the previous inquiry signal as described in connection with FIGS. 3A-3D.

Where the contents of storage are not modified (NO at S41), the CPU 11 terminates the present processing routine. At this time, the CPU 11 informs the PC 30 that there is no modification and, therefore, a signal "null", for example, may be sent. If the contents of storage are modified (YES at S41), the CPU 11 creates a server list (S42). The CPU 11 creates the server list while prioritizing servers of FIG. 3B in turn such that the top priority is given to the most lightly loaded server. The CPU 11 sends the created server list to the PC 30 (S43).

In S43, the CPU 11 refers to the sub-server table shown in FIG. 3B, detects the sub-server 20 in which the status of synchronization is set to "sync completion (OK)" from the sub-servers 20, and creates a server list based on the result of the detection. Thus, sub-servers 20 which have not completed reception of software resources can be removed from the server list. As a result, data can be delivered to PCs 30 more reliably and accurately.

In S43, the CPU 11 successively prioritizes the sub-servers 20 shown in the created server list such that the top priority is given to the most lightly loaded sub-server 20 shown in FIG. 3B. In this way, the items of the server list are aligned. The CPU 11 sends the reorganized server list to the PCs 30.

The CPU 11 makes a decision as to whether a reception completion signal is received from the PC 30 that sent the server list (S44). The reception completion signal is sent from the PC 30 at the timing of the operation S14 (already described in connection with FIG. 7) at which the PC 30 normally completed reception of software resources. If the reception completion signal is not received (NO at S44), the CPU 11 sends an error message to the system administrator or other user (S45). Then, the CPU 11 terminates the present processing routine. Where the reception completion signal is received (YES at S44), the CPU 11 determines that the software resources have been normally received and terminates the present processing routine.

In the processing routine of FIG. 11A, the CPU 11 makes a decision as to whether a PC 30 has made an access and requested software resources (S50). Where software resources are not requested (NO at S50), the CPU 11 terminates the present processing routine. Where software resources are requested (YES at S50), it is assured that the CPU 11 stores the software resources requested by the PC 30. The CPU sends the requested software resources to the PC 30 that requested the software resources (S51). The CPU 11 terminates the present processing routine.

Figure 11B:
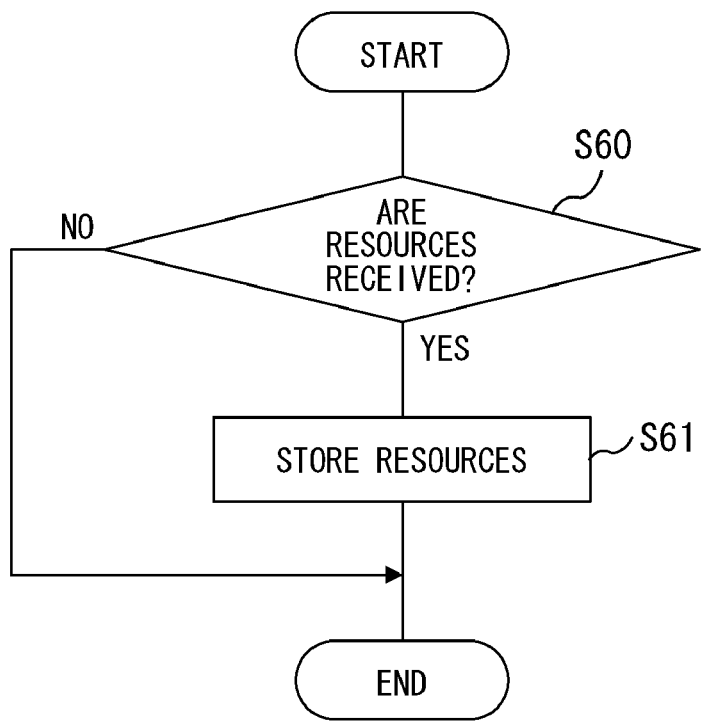
FIG. 11B is a flowchart illustrating processing operations executed by a sub-server to store software resource(s)
Figure 12:
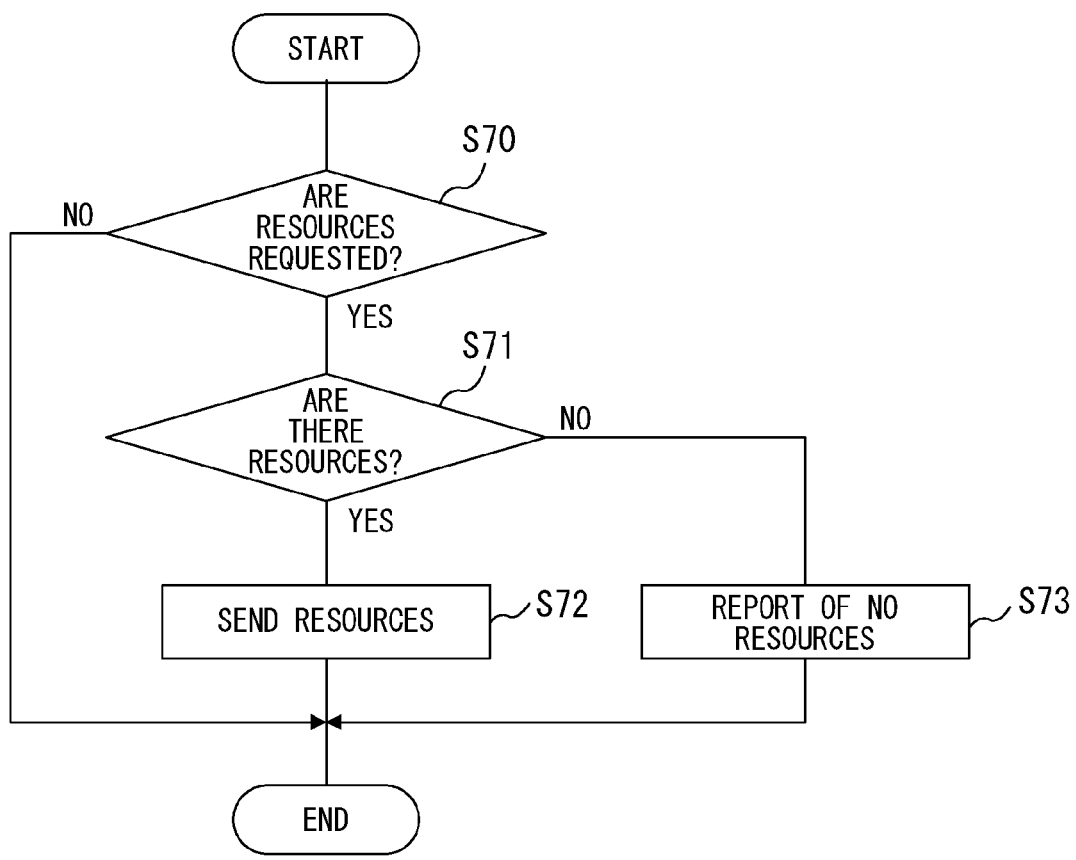
FIG. 12 is a flowchart illustrating processing operations executed by a sub-server to send software resource(s).

FIG. 11B is a flowchart illustrating processing operations performed by the sub-server 20 to store software resources. FIG. 12 is a flowchart illustrating processing operations performed by the sub-server 20 to send software resources. The following processing operations are carried out by the CPU 21 according to a control program stored in the ROM 22 of the sub-server 20.

In the processing operations of FIG. 11B, the CPU 21 makes a decision as to whether software resources have been received from the main server 10 (S60). Where no software resources have been received (NO at S60), the CPU 21 terminates the present processing routine. Where software resources have been received (YES at S60), the CPU 21 stores the received software resources in the mass storage device 24 (S61). Consequently, the sub-server 20 stores the same software resources as stored in the main server 10.

In the processing operations of FIG. 12, the CPU 21 makes a decision as to whether an access is made from the PC 30 and software resources are requested (S70). If no software resources are requested (NO at S70), the CPU 21 terminates the present processing routine. Where software resources are requested (YES at S70), the CPU 21 makes a decision as to whether the requested software resources are stored in the mass storage device 24 (S71).

Where the requested software resources are stored in the mass storage device 24 (YES at S71), the CPU 21 sends the requested software resources to the PC 30 that requested the software resources (S72). The CPU 31 terminates the present processing routine. On the other hand, where the requested software resources are not stored in the mass storage device 24 (NO at S71), the CPU 21 sends a signal to the effect that the requested software resources are not stored to the PC 30 (S73). The CPU 31 terminates the present processing routine.

As described so far, the data delivery system disclosed herein has the main server 10, sub-servers 20, and PCs 30. Because the main server 10 knows that software resources have been sent to the sub-servers 20, if an inquiry signal is received from any PC 30, it is possible to make a decision as to whether software resources to be received by the PC 30 are in the sub-servers 20 and could be directly accessed therefrom. The PC 30 receives software resources from the sub-servers 20 based on a result of the decision made by the main server 10 and so it is not necessary to make an inquiry to the sub-servers 20 as to whether or not there are software resources. As a result, if accurate and continual synchronization is not established between the main server 10 and sub-servers 20 or between the sub-servers 20 and PCs 30, the software resources stored in the main server 10 can be reliably acquired by the PCs 30.

Each terminal device actively makes an inquiry regarding transfer of software resources. This makes it unnecessary to minutely manage terminal devices by central equipment and intermediate servers. Furthermore, programming in the central equipment and in the intermediate servers is simplified. This alleviates the processing burdens on the central equipment and on the intermediate servers. By sending a list indicating from what intermediate server each terminal device receives software resources to the terminal device, loads on intermediate servers are distributed when terminal devices receive the software resources. The processing rate at which software resources are received can be managed appropriately.

Although embodiments have been described specifically thus far, various structures and operations can be modified appropriately. The present invention is not limited to the above-described embodiments.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention.

Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A data delivery system, comprising:
    central equipment in which software resources are stored, the central equipment having a communication function;
    at least one intermediate server capable of communicating with the central equipment and of receiving and storing the software resources sent from the central equipment; and
    terminal devices communicating with the central equipment and the intermediate server;
    wherein said central equipment including:
        a registration-accepting unit configured to accept registration of the software resources;
        a resource information storage unit configured to store resource information including a version number corresponding to each of the software resources accepted;
        a resource transfer unit configured to send the software resources accepted and the resource information stored in the resource information storage unit to the intermediate server;
        a server list-creating unit configured to create a server list of the intermediate servers to be sent to the terminal devices; and
        a list/information-sending unit configured to send the server list created by the server list-creating unit and the resource information to the terminal devices;
    wherein each of said terminal devices including:
        a synchronization decision unit configured to acquire the resource information sent from the intermediate server shown in the server list received from the central equipment by the resource transfer unit and stored in the intermediate server, comparing the resource information received from the central equipment with the resource information acquired from the intermediate server, and determining whether the intermediate server is synchronized with the central equipment based on whether sets of resource information stored therein are coincident in version number of software resources; and
        a request signal-sending unit which, when the determining indicates that the intermediate server is synchronized, sends a request signal requesting sending of the software resources to the intermediate server among the intermediate servers and sends the request signal to another one of the intermediate servers as indicated on the server list when the determining indicates the intermediate server is not synchronized.

2. A data delivery system as set forth in claim 1, comprising:
    a plurality of intermediate servers,
    wherein each of said terminal devices includes a reception decision unit for deciding whether the software resources have been received successfully in response to the request signal sent by the request signal-sending unit,
    wherein the request signal-sending unit causes the plural intermediate servers to send request signals in a given order until the reception decision unit determines that software resources have been received successfully,
    wherein the central equipment includes an order determination unit for determining an order in which the intermediate servers determined to be synchronized by the synchronization decision unit should receive request signals sent by the terminal devices, and wherein the server list-creating unit of the central equipment creates a server list including the order determined by the order determination unit.

3. A data delivery system as set forth in claim 2, wherein the order determination unit of the central equipment determines an order in which servers including the central equipment receive the request signals,
wherein when the order determination unit has determined the order in which servers including the central equipment receive the request signals, the request signal-sending unit of each of the terminal devices sends a request signal to the central equipment based on the order, and
wherein the central equipment includes a sending unit which, when the request signal is received, sends software resources responsive to the request signal to the terminal device.

4. A data delivery system as set forth in claim 2, wherein said central equipment includes:
   a load detection unit for detecting a processing load of the central equipment, and
   wherein the order determination unit determines an order in which the intermediate servers successively receive request signals from the terminal device such that the intermediate server having a lowest processing load by the load detection unit is given a top priority.

5. A data delivery system as set forth in claim 2, wherein each of said terminal devices wirelessly communicates with the central equipment and with the intermediate servers, and
   wherein the reception decision unit of the terminal device decides based on the wireless communication as to whether software resources have been received successfully.

6. A data delivery system as set forth in claim 1,
   wherein said terminal device includes an information acquisition unit for acquiring information of software resources stored in the terminal device when the central equipment is disabled,
   wherein the request signal-sending unit of the terminal device sends a request signal to the intermediate server together with the information acquired by the information acquisition unit of the terminal device, and
   the intermediate server includes:
      a resource acquisition unit for acquiring software resources stored in the terminal device based on information received from the request signal-sending unit when the request signal and the information are received from the request signal-sending unit,
      a decision unit deciding whether there are software resources to be received by the terminal device from the intermediate server by comparing the software resources acquired by the resource acquisition unit of the intermediate server with the software resources stored in the intermediate server, and
      a sending unit for sending the software resources to be received by the terminal device to the terminal device when the decision unit of the intermediate server has determined that there are software resources.

7. A data delivery method, comprising:
   preparing central equipment in which software resources are stored, the central equipment having a communication function;
   preparing intermediate servers in which software resources are stored, each of the intermediate servers having a communication function;
   connecting the central equipment and the intermediate servers and enabling communication therebetween;
   causing the central equipment to accept registration of software resources having a version number;
   storing resource information having the version number corresponding to the accepted software resources;
   sending the accepted software resources and the stored resource information to the intermediate servers;
   creating a server list of the intermediate servers to be sent to the terminal devices;
   sending the created server list and the resource information to the terminal devices;
   acquiring the resource information from the intermediate server shown in the server list received from the central equipment by the terminal devices, the resource information being stored in the intermediate server after being sent from the central equipment;
   causing the terminal devices to compare the resource information received from the central equipment with the resource information acquired from the intermediate server;
   causing the terminal devices to decide whether the intermediate server is synchronized with the central equipment depending on whether each of resource information are coincident in version number of software resources; and
   causing the terminal devices to send a request signal that requests the intermediate server to send software resources when synchronization has determined that the terminal device is synchronized, and where the request signal is sent to another one of the intermediate servers as indicated on the server list when the determining indicates the intermediate server is not synchronized.

8. A computer readable non-transitory storage medium having stored therein a program for executing an operation, comprising:
   receiving a priority order listing servers including a main server communicating with one of multiple terminals via an intermediate server;
   determining, at said one of multiple terminals, whether the resource in the main server and the intermediate server are synchronized; and
   sending the request to the intermediate server only after determining synchronization of the main server with the intermediate server at said one of multiple terminals, where the request is sent to another intermediate server according to the priority order when the determining indicates the intermediate server is not synchronized.

\* \* \* \* \*